(12) United States Patent
Fritz (10) Patent No.: US 11,167,757 B2
(45) Date of Patent: Nov. 9, 2021

(54) METHOD AND DEVICE FOR CONTROLLING A LONGITUDINAL POSITION OF A VEHICLE

(71) Applicant: DAIMLER AG, Stuttgart (DE)

(72) Inventor: Johannes Albert Fritz, Ebersbach (DE)

(73) Assignee: DAIMLER AG, Stuttgart (DE)

(*) Notice: Subject to any disclaimer, the term of this patent is extended or adjusted under 35 U.S.C. 154(b) by 33 days.

(21) Appl. No.: 16/760,349

(22) PCT Filed: Jun. 20, 2018

(86) PCT No.: PCT/EP2018/066483
§ 371 (c)(1),
(2) Date: Apr. 29, 2020

(87) PCT Pub. No.: WO2019/086149
PCT Pub. Date: May 9, 2019

(65) Prior Publication Data
US 2021/0179100 A1    Jun. 17, 2021

(30) Foreign Application Priority Data
Oct. 30, 2017    (DE) ...................... 10 2017 010 180.9

(51) Int. Cl.
*B60W 30/10* (2006.01)
*B60W 50/00* (2006.01)

(52) U.S. Cl.
CPC ........ *B60W 30/10* (2013.01); *B60W 50/0097* (2013.01); *B60W 2050/0008* (2013.01); *B60W 2520/105* (2013.01)

(58) Field of Classification Search
CPC ............. B60W 30/10; B60W 50/0097; B60W 2050/0008; B60W 2520/105
See application file for complete search history.

(56) References Cited

U.S. PATENT DOCUMENTS 5,568,378 A    10/1996    Wojsznis
5,901,059 A    5/1999    Tao et al.
(Continued)

FOREIGN PATENT DOCUMENTS

DE    19818328 A1    11/1998
DE    19632337 C2    12/2000
(Continued)

OTHER PUBLICATIONS

International Search Report dated Oct. 12, 2018 in related/corresponding International Application No. PCT/EP2018/066483.
(Continued)

*Primary Examiner* — Jeff A Burke
*Assistant Examiner* — Mohamad O El Sayah
(74) *Attorney, Agent, or Firm* — Patent Portfolio Builders PLLC (57) ABSTRACT

A method for controlling a longitudinal position of a vehicle involves a longitudinal positioning control system generating a longitudinal acceleration control signal from a longitudinal dynamic feedforward set point and from longitudinal dynamic control error quantities for a subordinate acceleration control unit acting on a drive device and braking device of the vehicle. A current control reference point corresponding to a current time point and at least one forward control reference point corresponding to a presettable look-ahead time point are determined as control-relevant time points, current or predicted actual/required deviations of a longitudinal position, of a driving speed and of acceleration are determined for each of the control reference points and provide the basis for forming the longitudinal dynamic control error quantities, and required values of an acceleration are determined for each of the control reference points and provide the basis for forming the longitudinal dynamic feedforward set point.

9 Claims, 4 Drawing Sheets

(56) References Cited

U.S. PATENT DOCUMENTS

| | | |
|---|---|---|
| 6,098,007 A | 8/2000 | Fritz |
| 6,236,915 B1 | 5/2001 | Furukawa et al. |
| 2002/0107106 A1* | 8/2002 | Kato ..................... F16H 61/143 477/110 |
| 2009/0048748 A1 | 2/2009 | Zhao et al. |
| 2015/0073663 A1* | 3/2015 | Nilsson ............. B60W 50/0098 701/41 |
| 2016/0159352 A1 | 6/2016 | Kim et al. |
| 2018/0046198 A1* | 2/2018 | Nordbruch ........... G05D 1/0282 |

FOREIGN PATENT DOCUMENTS

| | | | |
|---|---|---|---|
| DE | 102010055373 A1 | 6/2012 | |
| DE | 102015003124 A1 | 9/2016 | |
| DE | 102015223611 A1 | 6/2017 | |
| EP | 3144916 A2 * | 3/2017 | ............ B60W 30/17 |

OTHER PUBLICATIONS

Office Action dated Apr. 26, 2018 in related/corresponding DE Application No. 10 2017 010 180.9.

Written Opinion dated Oct. 12, 2018 in related/corresponding International Application No. PCT/EP2018/066483.

* cited by examiner

METHOD AND DEVICE FOR CONTROLLING A LONGITUDINAL POSITION OF A VEHICLE

BACKGROUND AND SUMMARY OF THE INVENTION

Exemplary embodiments of the invention relate to a method and a device for controlling a longitudinal position of a vehicle.

Conventional longitudinal control systems for vehicles, for example conventional adaptive cruise control, control a driving speed of a vehicle in such a way that a speed set by the driver or, if a vehicle is detected ahead, a presettable required distance from the vehicle ahead, is maintained. In this case a time-current actual distance from the vehicle ahead is typically measured by means of a distance sensor system, for example radar or lidar, and a current actual driving speed of the vehicle is measured and, dependent thereon, and as a function of the set speed and the required distance, control actions are performed for accelerating or decelerating the vehicle.

DE 102010055373 A1 discloses a method for controlling the longitudinal dynamics of a motor vehicle in which the longitudinal dynamics is controlled as a function of a required acceleration, wherein the required acceleration is additionally determined as a function of a weighting factor to reduce the sensitivity of the method in situations that are less critical for the motor vehicle.

DE 19632337 C2 discloses a method and a device are known from for controlling the longitudinal dynamics of a motor vehicle, in which, as the control output signal, at least one power train control signal is determined as a function of input data on the required longitudinal speed or the required longitudinal acceleration and the actual driving condition.

DE 102015003124 A1 discloses a method and a device for operating a vehicle in an automated, especially autonomous driving mode in which in certain operational circumstances, trajectory control is performed for controlling a longitudinal position of a vehicle. The trajectory control is then based on a specified required value, by which a required variation of a position and speed of the vehicle is specified.

Exemplary embodiments of the invention are directed to a method for controlling the longitudinal position of a vehicle, which is suitable for a highly automated or autonomous driving mode of the vehicle. A further object of the invention is to provide a device suitable for carrying out the control.

In the method according to the invention for controlling the longitudinal position of a vehicle, a longitudinal acceleration control signal is generated for a subordinate acceleration control unit by means of a longitudinal positioning control system from a longitudinal dynamic feedforward set point and from longitudinal dynamic control error quantities. The following steps are carried out:

A current control reference point and at least one forward control reference point are determined as control-relevant time points. The current control reference point then corresponds to a current time point, and the or each forward control reference point corresponds to a presettable look-ahead time point.

Current or predicted actual/required deviations of a longitudinal position, of a driving speed and of an acceleration are determined for each of the control reference points. The determined actual/required deviations are then taken as the basis for forming the longitudinal dynamic control error quantities.

For each of the control reference points, required values of an acceleration are determined and taken as the basis for forming the longitudinal dynamic feedforward set point.

In other words: The control system is based on feedforward control as a function of current and future required values of the acceleration and on feedback as a function of current and predictively determined future control errors.

Advantageously, the longitudinal dynamic control error quantities are formed in each case for the longitudinal position, the driving speed and the acceleration, wherein, for forming these quantities, the current and predicted actual/required deviations of the longitudinal position or of the driving speed or of the acceleration determined for the control reference points are in each case weighted and summed together. In other words: the longitudinal dynamic control error quantity of the longitudinal position is formed by weighting and summing the current actual/required deviation of the longitudinal position with the predicted actual/required deviation of the longitudinal position, the longitudinal dynamic control error quantity of the driving speed is formed by weighting and summing the current actual/required deviation of the driving speed with the predicted actual/required deviation of the driving speed, and the longitudinal dynamic control error quantity of the acceleration is formed by weighting and summing the current actual/required deviation of the acceleration with the predicted actual/required deviations of the acceleration.

Advantageously, the longitudinal dynamic feedforward set point is formed by weighting and summing together the required values of the acceleration determined for the control reference points.

Advantageously, the weighted summation is performed with specified weights.

The longitudinal dynamic feedforward set point and the longitudinal dynamic control error quantities are advantageously determined on the basis of a specified required value, by which the temporal required variations of the longitudinal position, driving speed and acceleration of the vehicle are specified.

The temporal required variation of the longitudinal position then advantageously specifies a length of a distance that the vehicle should cover starting from the current control reference point over time.

Advantageously, future required values of the longitudinal position, driving speed and acceleration and predicted actual values of the longitudinal position, driving speed and acceleration are determined for determining the predicted actual/required deviations of the longitudinal position, driving speed and acceleration for the forward control reference point or, if several forward control reference points have been determined, for each of the forward control reference points. Determination of the required values is then based on the specified required value, and determination of the predicted actual values is based on a prediction of the vehicle's motion. From the determined required values and the predicted actual values of the longitudinal position, driving speed and acceleration, the predicted actual/required deviations of the longitudinal position, driving speed and acceleration are then determined by an actual/required comparison.

Advantageously, the current actual/required deviations of the longitudinal position, driving speed and acceleration are determined by determining current required values of the longitudinal position, driving speed and acceleration for the current control reference point, based on the specified required value, and in each case they are compared to a determined current actual value of the position, driving speed or acceleration of the vehicle.

In an advantageous embodiment of the method, in the longitudinal positioning control system, a feedforward controller actuating component is generated from the longitudinal dynamic feedforward set point and a feedback controller actuating component is generated from the longitudinal dynamic control error quantities, and summed together to form the longitudinal acceleration control signal and preferably limited as a function of speed.

In an advantageous development of the method, for each of the forward control reference points, it is tested whether a required value of the longitudinal position determined for the respective control reference point and/or a required value of the driving speed determined for the respective control reference point and/or a required value of the acceleration determined for the respective control reference point lie within a control region specified for the longitudinal position or for the driving speed or for the acceleration, and if that is not the case, the respective control reference point is discarded, i.e., it is not taken into account during control.

A device according to the invention for controlling the longitudinal position of the vehicle comprises a control point and control error determination unit for determining longitudinal dynamic control error quantities based on a weighted summation of determined current actual/required deviations and predicted actual/required deviations of a longitudinal position, a driving speed and an acceleration and for determining a longitudinal dynamic feedforward set point based on a weighted summation of current and future required values of the acceleration and it further comprises a downstream longitudinal positioning control system for generating a feedforward controller actuating component from the longitudinal dynamic feedforward set point and a feedback controller actuating component from the longitudinal dynamic control error quantities and for generating, based on a summation of the feedforward controller actuating component with the feedback controller actuating component, a longitudinal acceleration control signal for an acceleration control unit acting on a drive device and braking device of the vehicle.

The method according to the invention and the device according to the invention are most suitable for use in highly automated or autonomous vehicles, because, due to the feedforward consideration of the vehicle's own longitudinal dynamic movement, precise, safe control is achieved and the required storage requirement and the computational cost are small. Furthermore, the control behavior can be adapted in a simple manner, by situation-dependent selection of the forward control reference points, to the instantaneous environmental situation, which leads to robust control behavior.

BRIEF DESCRIPTION OF THE DRAWING FIGURES

Exemplary embodiments of the invention are explained in more detail hereunder, referring to drawings.

These show:

FIG. 1 a block circuit diagram of a device for controlling the longitudinal position of a vehicle, FIG. 2 an exemplary embodiment for a longitudinal positioning control system shown in FIG. 1, FIG. 3 a diagram with driving speed-dependent limiting characteristics for limiting a longitudinal acceleration control signal, FIG. 4 an exemplary embodiment for a longitudinal positioning control system shown in FIG. 2, FIG. 5 a diagram with limit characteristics for sorting out control reference points that should not be taken into account during control.

Parts that correspond to one another are provided with the same reference symbols in all the figures.

DETAILED DESCRIPTION

Figure 1:
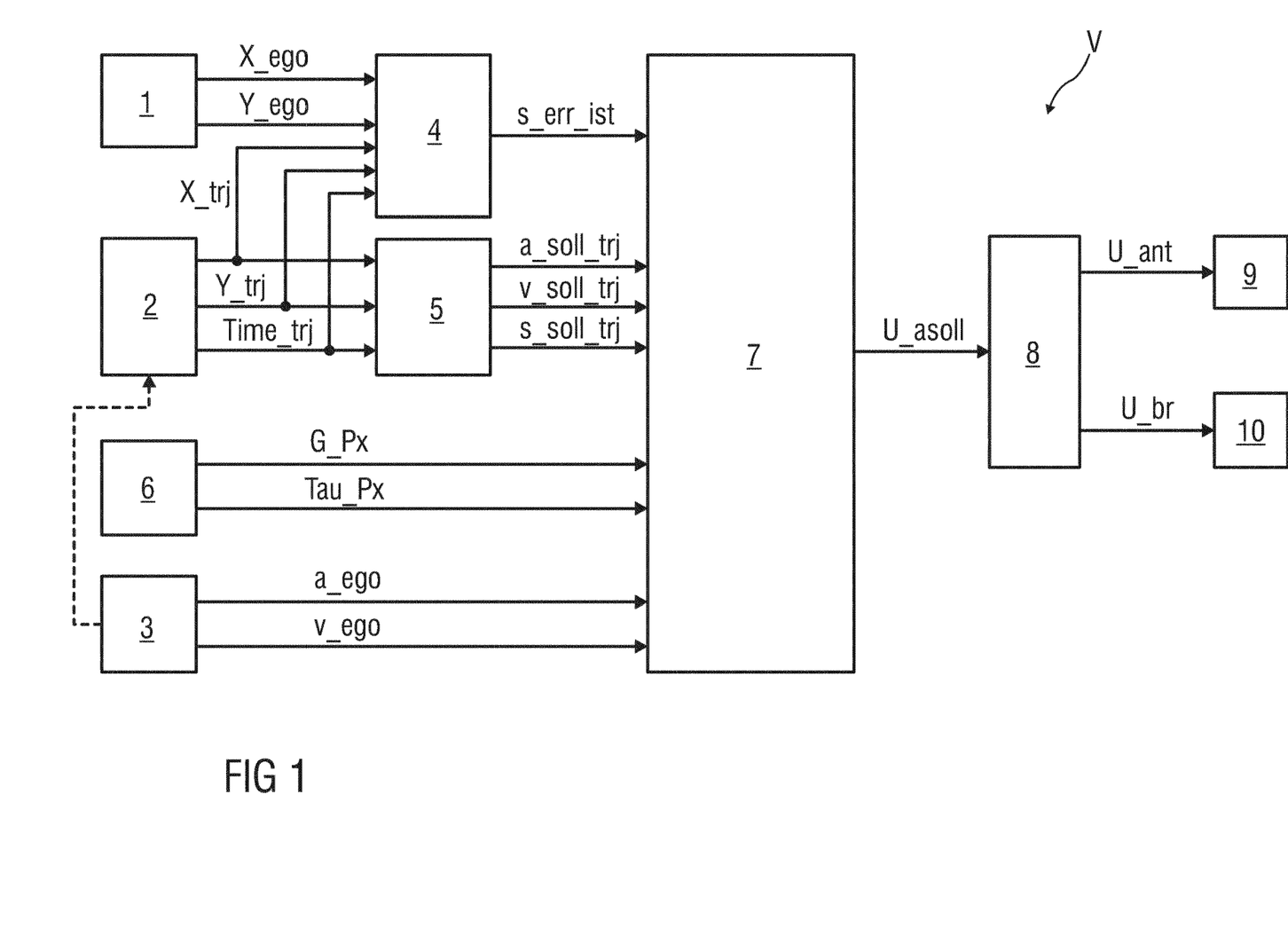

FIG. 1 shows a schematic representation of a block circuit diagram of a device V for controlling the longitudinal position of a vehicle, not shown in more detail, especially a highly automated or autonomous vehicle.

The device V is in particular an integral constituent of a vehicle assistance system, in particular a drive assistance system. The function blocks shown may be configured as hardware or as a computer program.

The device V for longitudinal position control of the vehicle comprises a position determination unit 1, which detects the current actual position $\{X\_ego, Y\_ego\}$ of the vehicle for a current time point $t_k$. The current actual position $\{X\_ego, Y\_ego\}$ can be determined, for example, as a coordinate point of a global coordinate system. The position determination takes place conventionally, for example by means of a satellite-supported global navigation system, especially by means of GPS (GPS=global positioning system), and/or on the basis of recognized landmarks in conjunction with a landmark map or similar.

The device V further comprises a planning unit 2, which determines time stamp-based required positions $\{X_i, Y_i, t_i\}$ for the current time point $t_i=t_k$ and for further forward time points $\{t_i=t_j, \ldots, t_N$ with $t_j>t_k\}$ on the basis of a determined current driving situation and on the basis of the information about the current actual position $\{X\_ego, Y\_ego\}$ of the vehicle and optionally other identified vehicles and road users and on the basis of environmental information about an available free traffic space around the vehicle. The time stamp-based required positions of the 2-dimensional required positional trajectory $\{X\_trj, Y\_trj, Time\_trj\}$ are outputted in the form of two required position coordinate trajectories X_trj with X_trj=$\{X_1, \ldots, X_k, \ldots, X_N\}$ and Y_trj with Y_trj=$\{Y_1, \ldots, Y_k, \ldots, Y_N\}$ and an associated time stamp trajectory Time_trj with Time_trj=$\{t_1, \ldots, t_k, \ldots, t_N\}$.

The device V further comprises a driving condition recognition unit 3, which acquires the variables relevant to the longitudinal dynamics, in particular the current actual values of the driving speed v and acceleration a of the vehicle, hereinafter called actual driving speed v_ego and actual acceleration a_ego respectively. Acquisition takes place conventionally, for example by means of a camera, a speed sensor, an acceleration sensor or a radar unit.

The device V further comprises an actual position error determination unit 4, which is supplied with the current actual position $\{X\_ego, Y\_ego\}$ and the required position coordinate trajectories X_trj, Y_trj and the associated time stamp trajectory Time_trj as input data. The actual position error determination unit 4 determines, from the input data supplied to it, the required position $\{X_k, Y_k\}$ for the current time point $t_k$ and determines, for the current time point $t_k$, the current actual/required deviation s_err_ist of the longitudinal position s, also called current longitudinal position error s_err_ist hereinafter. The current longitudinal position error s_err_ist corresponds to the longitudinal component of the stretch of road between the current actual position $\{X\_ego, Y\_ego\}$ and the required position $\{X_k, Y_k\}$. The longitudinal component relates to the longitudinal direction of the required motion of the vehicle, i.e., it relates to a direction that extends at the current required position $\{X_k, Y_k\}$ tangentially to a path defined by the required positions $\{X_i, Y_i, t_i\}$.

The device V further comprises a required longitudinal dynamic trajectory determination unit 5, which is supplied with the required position coordinate trajectories X_trj, Y_trj and the associated time stamp trajectory Time_trj of the 2-dimensional required positional trajectory {X_trj, Y_trj, Time_trj} as input data, and which determines from these, three 1-dimensional reference longitudinal dynamic trajectories, called required longitudinal dynamic trajectories hereinafter, namely the required longitudinal position trajectory s_soll_trj, the required driving speed trajectory v_soll_trj and the required acceleration trajectory a_soll_trj. These required longitudinal dynamic trajectories s_soll_trj, v_soll_trj, a_soll_trj represent a specified required value, by which a required value of the longitudinal position s or of the driving speed v or of the acceleration a is specified in each case for the current time point $t_k$ and for a series of forward time points $\{t_i, \ldots, t_N$ with $(t_k < t_i \le t_N)\}$. The required longitudinal dynamic trajectories s_soll_trj, v_soll_trj, a_soll_trj may thus be represented as vectors consisting of a series of required values as follows, $$s\_soll\_trj = \{s\_soll(t_k) \ldots, s\_soll(t_N)\},$$

$$v\_sol\_trj = \{v\_soll(t_k) \ldots, v\_soll(t_N)\},$$

$$a\_soll\_trj = \{a\_soll(t_k) \ldots, a\_soll(t_N)\},$$

wherein $s\_soll(t_i)$ represents the required value of the longitudinal position s at the time point $t_i$, $v\_soll(t_i)$ the required value of the driving speed v at the time point $t_i$ and $a\_soll(t_i)$ the required value of the acceleration a at the time point $t_i$ and wherein $t_i$ represents a time point from a series of, preferably equidistant, time points $\{t_k, \ldots, t_N\}$, which starts with the current time point $t_k$ and ends with a time point $t_N$ defining a look-ahead horizon.

The device V further comprises a control reference point weighting setting unit 6, which specifies a series with a preset number R of relative look-ahead times $\{tau_{Pj}; j=1, \ldots, R\}$. These relative look-ahead times are all referred to the current time point $t_k$ and combined in a vector $Tau\_Px = \{tau_{P1}, \ldots, tau_{PR}\}$. Each of the relative look-ahead times $tau_{Pj}$ specifies an absolute look-ahead time point $t_{\_Pj}$ according to the relation $t_{\_Pj} = t_k + tau_{\_Pj}$. The current time point $t_k$ and the set of preset look-ahead time points $\{t_{\_Pj}; j=1, \ldots, R\}$ represent control-relevant time points. The control-relevant time points define a series of control reference points $\{P_0, P_1, \ldots P_R\}$, which comprise a current control reference point $P_0$, which corresponds to the current time point $t_k$, and comprise forward control reference points $\{P_1, \ldots, P_R\}$, which in each case correspond to one of the look-ahead time points $\{t_{\_Pj}; j=1, \ldots, R\}$. The control reference point weighting setting unit 6 assigns to each control reference point Pi a series of preset weights $\{G_{f\!f\_Pi}, G_{s\_Pi}, G_{v\_Pi}, G_{a\_Pi}\}$, which are in each case combined in a vector $G_{\_Pi} = \{G_{f\!f\_Pi}, G_{s\_Pi}, G_{v\_Pi}, G_{a\_Pi}\}$ assigned to the respective control reference point Pi. The set of vectors $G_{\_Pi}$ for all of the control reference points Pi with $i=0, 1, \ldots R$ are in their turn combined in a matrix $G\_Px = \{G_{\_P0}, G_{\_P1}, \ldots, G_{\_Pj}, \ldots, G_{\_PR}\}$. In the above:

$G_{f\!f\_Pi}$ denotes a specified feedforward weight, which is assigned to the control reference point Pi, $G_{s\_Pi}$ denotes a specified longitudinal position control error weight, which is assigned to the control reference point Pi, $G_{v\_Pi}$ denotes a specified driving speed control error weight, which is assigned to the control reference point Pi and $G_{a\_Pi}$ denotes a specified acceleration control error weight, which is assigned to the control reference point Pi.

The device V further comprises a longitudinal position control device 7, to which several inputs are supplied. These inputs comprise the current longitudinal position error s_err_ist, the required longitudinal dynamic trajectories s_soll_trj, v_soll_trj, a_soll_trj, the matrix G_Px, the vector Tau_Px and the actual driving speed v_ego and the actual acceleration a_ego. The longitudinal position control device 7 generates, from the inputs supplied to it, a longitudinal acceleration control signal U_asoll, which is supplied to a subordinate acceleration control unit 8 as input signal.

The acceleration control unit 8 is configured as a conventional controller, which controls the acceleration of the vehicle to a value specified by the longitudinal acceleration control signal U_asoll, by generating, from the longitudinal acceleration control signal U_asoll, control values U_ant and U_br for controlling actuating elements of a drive device 9 and of a braking device 10 of the vehicle.

Figure 2:
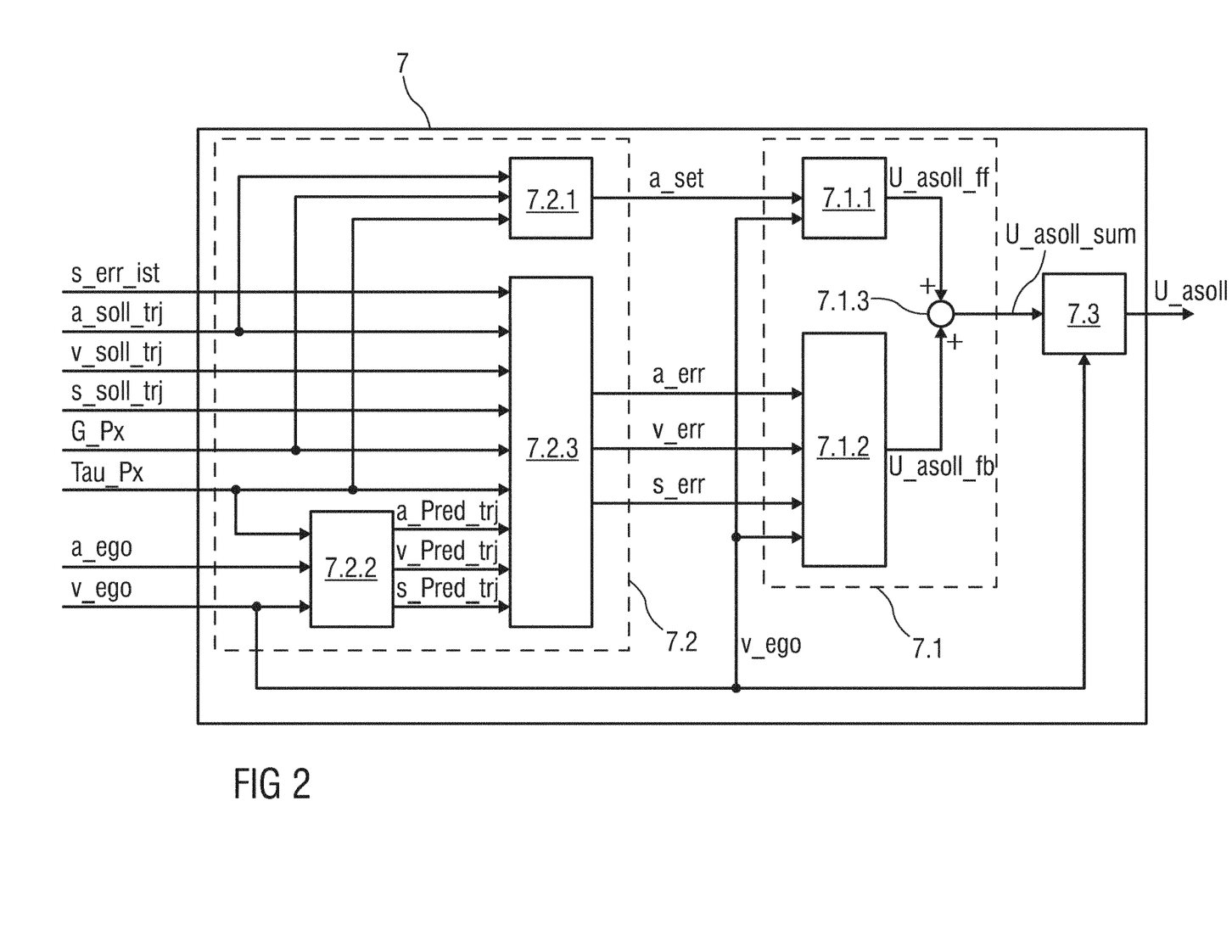

FIG. 2 shows, also schematically, a block circuit diagram of the longitudinal position control device 7. The longitudinal position control device 7 is of multistage construction. It comprises a longitudinal positioning control system 7.1, a control point and control error determination unit 7.2 preceding the longitudinal positioning control system 7.1 and a limiting unit 7.3 following the longitudinal positioning control system 7.1.

The control point and control error determination unit 7.2 generates, from the inputs supplied to the longitudinal position control device 7, a longitudinal dynamic feedforward set point a_set and longitudinal dynamic control error quantities s_err, v_err, a_err of the longitudinal position s, of the driving speed v and of the acceleration a. The longitudinal dynamic control error quantities s_err, v_err, a_err of the longitudinal position s, of the driving speed v and of the acceleration a are also designated hereinafter, for simplicity, as position control error s_err or driving speed control error v_err or acceleration control error a_err. The longitudinal positioning control system 7.1 generates, from the longitudinal dynamic feedforward set point a_set and the longitudinal dynamic control error quantities s_err, v_err, a_err, an intermediate longitudinal acceleration control signal U_asoll_sum and the limiting unit 7.3 generates, from the intermediate longitudinal acceleration control signal U_asoll_sum by speed-dependent limiting, the longitudinal acceleration control signal U_asoll for the acceleration control unit 8.

FIG. 2 shows in detail the various subsystems that are components of the longitudinal positioning control system 7.1 and of the control point and control error determination unit 7.2.

The longitudinal positioning control system 7.1 comprises a controller feedforward unit 7.1.1 for generating a feedforward controller actuating component U_asoll_ff from the longitudinal dynamic feedforward set point a_set, a feedback unit 7.1.3 for generating a feedback controller actuating component U_asoll_fb from the longitudinal dynamic control error quantities s_err, v_err, a_err and a summing element 7.1.3 for summing the feedforward controller actuating component U_asoll_ff and the feedback controller actuating component U_asoll_fb into an aggregate signal, the intermediate longitudinal acceleration control signal U_asoll_sum.

The control point and control error determination unit 7.2 comprises the following three subsystems: a first subsystem

7.2.1, which is provided for generating a longitudinal dynamic feedforward set point a_set from the required acceleration trajectory a_soll_trj, the matrix G_Px, and the vector Tau_Px, a second subsystem 7.2.2, which is provided for predicting the longitudinal dynamic state of the vehicle from the actual driving speed v_ego, the actual acceleration a_ego and the vector Tau_Px, and a third subsystem 7.2.3, which is provided for determining the longitudinal dynamic control error quantities s_err, v_err, a_err from the current longitudinal position error s_err_ist, the required longitudinal dynamic trajectories s_soll_trj, v_soll_trj, a_soll_trj, the matrix G_Px, the vector Tau_Px and the result of the prediction performed by the second subsystem 7.2.2.

The limiting unit 7.3 is supplied with the intermediate longitudinal acceleration control signal U_asoll_sum and the actual driving speed v_ego from the driving condition recognition unit 3. The intermediate longitudinal acceleration control signal U_asoll_sum is limited in the limiting unit 7.3 as a function of the actual driving speed v_ego. The result of this limitation is the longitudinal acceleration control signal U_asoll, which is supplied as input to the acceleration control unit 8 (see FIG. 1).

Positive and negative intermediate longitudinal acceleration control signals U_asoll_sum are limited differently for the drive device 9 and for the braking device 10, if there is different actuating element behavior for the drive device 9 and for the braking device 10. This may be achieved, for example as shown in FIG. 3, by means of different driving speed-dependent limitation characteristics K9, K10.

Figure 3:
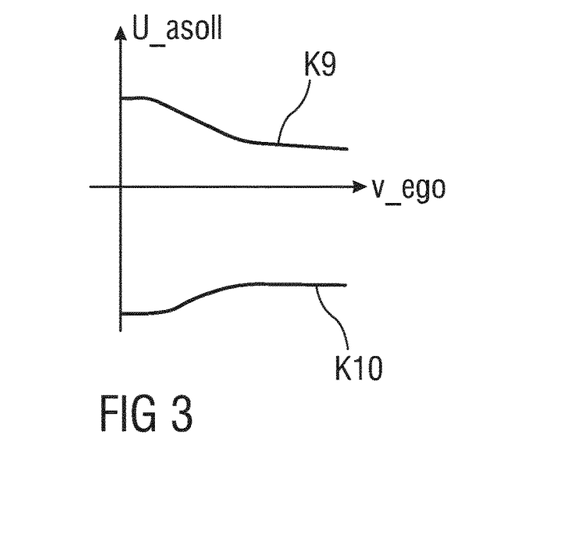

FIG. 3 shows, as an example, driving speed-dependent limitation characteristics K9, K10 for the required longitudinal acceleration control signal U_asoll for the drive device 9 and for the braking device 10. These limitation characteristics K9, K10 are stored for example in a memory of the limiting unit 7.3.

Figure 4:
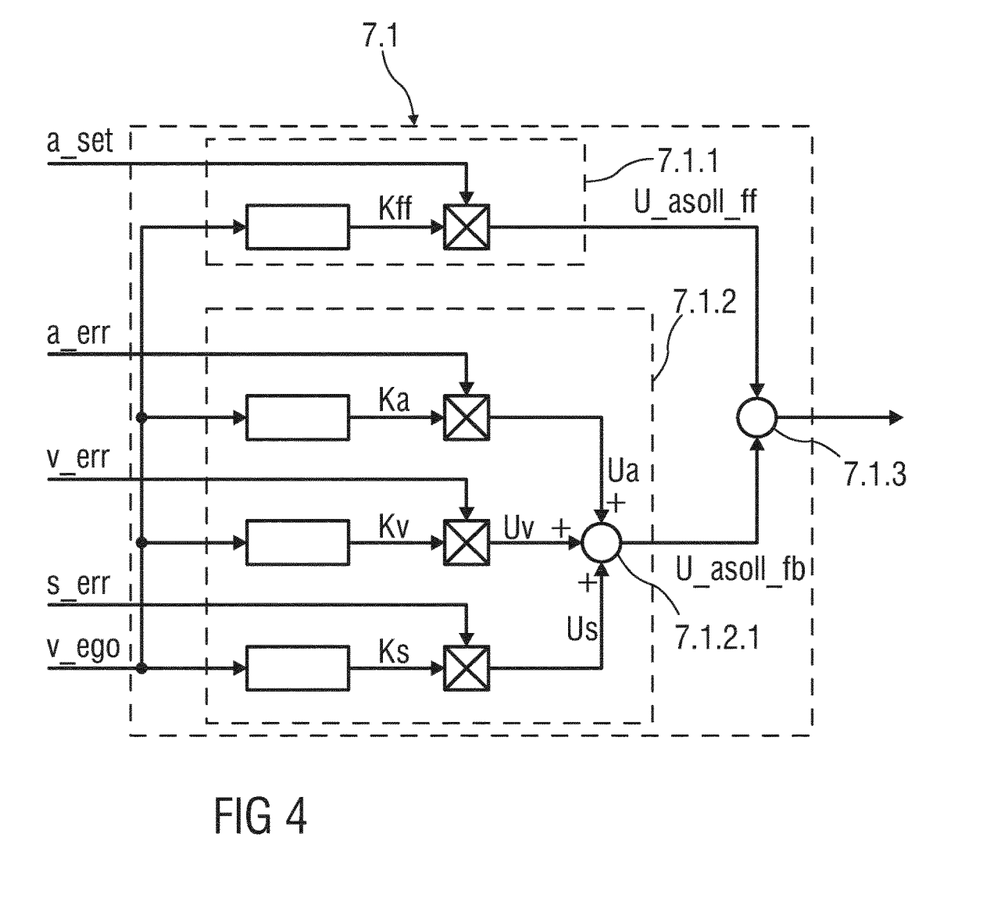

FIG. 4 shows, as an example, a position controller 7.1, for which the controller feedback unit 7.1.2 is configured as a third-order status controller.

In accordance with FIG. 4, the position control error s_err is multiplied by a longitudinal position feedback factor $K_s$, thus forming a longitudinal position control component $U_s$. The driving speed control error v_err is multiplied by a driving speed feedback factor $K_v$ to give a driving speed control component $U_v$. The acceleration control error a_err is multiplied by an acceleration feedback factor $K_a$ to give an acceleration control component $U_a$. The feedback control actuating component U_asoll_fb is then formed by summing the control components $U_s$, $U_v$, $U_a$ by means of a summing element 7.1.2.1.

The feedforward control actuating component U_asoll_ff is formed by multiplying the longitudinal dynamic feedforward set point a_set by a feedforward factor $K_{ff}$.

A further embodiment envisages configuring the position controller 7.1 as a function of the current driving situation. For example, it is advantageous to preset the feedback factors $K_s$, $K_v$, $K_a$ and the feedforward factor $K_{ff}$ via specified speed-dependent functions $F_s(v\_ego)$, $F_v(v\_ego)$, $F_a(v\_ego)$, and $F_{ff}(v\_ego)$ as a function of the actual driving speed v_ego.

In the control point and control error determination unit 7.2, firstly absolute time points $t_{\_Pj}$ are determined correspondingly from the relative look-ahead times $tau_{\_Pj1}$ specified by the control reference point weighting setting unit 6 via the temporal relation $t_{\_Pj}=t_k+tau_{\_Pj}$ and combined in a control reference point time stamp vector according to:

$$T\_Px=\{t_{\_P1},\ldots,t_{\_Pj},\ldots,t_{\_PR} \text{ with}(t_k<t_{\_Pj}\leq t_N)\}$$

Then the required values of the longitudinal position $\{s\_soll(t_{\_P1}),\ldots,s\_soll(t_{\_PR})\}$, the required values of the driving speed $\{v\_soll(t_{\_P1}),\ldots,v\_soll(t_{\_PR})\}$, and the required values of the acceleration $\{a\_soll(t_{\_P1}),\ldots,a\_soll(t_{\_PR})\}$ are determined from the required longitudinal dynamic trajectories s_soll_trj, v_soll_trj and a_soll_trj specified by the required longitudinal dynamic trajectory determination unit 5 for the forward control reference points $\{P_1,\ldots,P_j,\ldots,P_R\}$.

In the second subsystem 7.2.2, prediction of the longitudinal dynamic state of the vehicle, also called EGO prediction, is carried out. For this, advantageously, previously identified longitudinal dynamic models, which describe the longitudinal dynamic behavior of the vehicle, are used.

For example, linear time-discrete models of the form:

$$x(t_i+dT)=A_d*X(t_i)+b_d*U$$

are used, wherein x represents a state vector describing the longitudinal dynamic behavior, $A_d$ represents a system matrix, $b_d$ represents an input vector, U represents a system input, dT represents the prediction time increment and $t_i$ represents the prediction time point.

The real system contains dead times, which are not described by the linear system, and these are taken into account, in addition to the linear time-discrete system model, by means of a dead-time model.

Prediction of the longitudinal dynamic states starts again, at each current, real time point $t_k$ with corresponding initial values for the state vector, combined in the initial state vector x_0.

Prediction of the longitudinal dynamic states of the vehicle (EGO prediction) is performed at each current time point $t_k$ with N_pred prediction time steps for a prediction horizon T_pred=dT*N_pred, which is selected in such a way that all forward time points $(t_i=t_k+i*dT)$, which are set via the relative look-ahead times $\{tau_{\_P1},\ldots,tau_{\_Pj},\ldots,tau_{\_PR}\}$ associated with the forward control reference points $\{P_1,\ldots,P_j,\ldots,P_R\}$ or the absolute time stamps $\{t_{\_P1},\ldots,t_{\_Pj},\ldots,t_{\_PR}\}$ corresponding thereto, are contained in the prediction horizon.

By the EGO prediction, a predicted actual value $s\_pred(t_{\_Pi})$ of the longitudinal position s, a predicted actual value $v\_pred(t_{\_Pi})$ of the driving speed v and a predicted actual value $a\_pred(t_{\_Pi})$ of the acceleration a are determined for each forward control reference point $P_1$ with $i=1,\ldots,R$.

After the EGO prediction, the subsystem 7.2.2 supplies, as outputs, a predicted actual longitudinal position trajectory s_pred_trj, which comprises the set of the predicted actual values of the longitudinal position s:

$$s\_pred\_trj=\{s\_pred(t_{\_P1}),\ldots,s\_pred(t_{\_PR})\},$$

a predicted actual driving speed trajectory v_pred_trj, which comprises the set of the predicted actual values of the driving speed v:

$$v\_pred\_trj=\{v\_pred(t_{\_P1})\ldots,v\_pred(t_{\_PR})\}$$

and a predicted actual acceleration trajectory a_pred_trj, which comprises the set of the predicted actual values of the acceleration a:

$$a\_pred\_trj=\{a\_pred(t_{\_P1})\ldots,a\_pred(t_{\_PR})\}.$$

In a simple embodiment of the control point and control error determination unit 7.2, it is assumed in the second subsystem 7.2.2 that in the look-ahead time horizon considered, the vehicle continues to move with constant acceleration. Possible effects on the longitudinal dynamic behavior, which are caused by control error corrections for example of the longitudinal positioning control system 7.1, are not taken into account in this simple prediction.

The simple third-order longitudinal dynamic model is described by a discrete system matrix:

$$A_d=[a1,a2,a3],$$

which contains three row vectors a1, a2, a3, and a vanishing input vector, i.e. $b_d=0$. The determined elements of the row vectors:

$$a1=[1,dT,0.5*dT*dT],$$

$$a2=[0,1,*dT],$$

$$a2=[0,0,1]$$

of the system matrix are in this case only dependent on the prediction time increment dT. This simplified longitudinal dynamic model, forming the basis of the prediction, corresponds to a double-integrator model.

The state vector $x=[x1, x2, x3]$ describing the longitudinal dynamic behavior contains the three states:
stretch of road $x1=s\_pred$,
driving speed $x2=v\_pred$ and
longitudinal acceleration $x3=a\_pred$.

For the third-order system presented, initial values are specified as follows:
The stretch of road $x1=s\_pred$ is initialized to the value zero, i.e.:

$$x1\_0=x1(t_i=t_k)=s\_pred(tau=0)=0.$$

The initial speed is initialized equal to the current actual driving speed v_ego, i.e.:

$$x2\_0=x2(t_i=t_k)=v\_pred(tau=0)=v\_ego.$$

The initial acceleration is initialized equal to the current actual driving acceleration a_ego, i.e.:

$$x3\_0=x3(t_i=t_k)=a\_pred(tau=0)=a\_ego.$$

In a simple embodiment of the EGO prediction, the longitudinal dynamic predicted actual values of the longitudinal position s, of the driving speed v and of the acceleration a of the vehicle for forward time points $\{t_{\_P1}, \ldots, t_{\_Pj}, \ldots, t_{\_PR}\}$ are determined in simplified time-discrete form according to the relations:

$$s\_pred(t_{\_Pj})=tau_{\_Pj}*v\_ego(t_k)+ 0.5*tau_{\_Pj}*tau_{\_Pj}*a\_ego,$$

$$v\_pred(t_{\_Pj})=v\_ego(t_k)+tau_{\_Pj}*a\_ego,$$

$$a\_pred(t_{\_Pj})=a\_ego,$$

in each case with j=1, ..., R.

As a simplification, in each case the prediction time increment dT is set equal to the relative look-ahead time $tau_{\_Pj}$ associated with the control reference point Pj. In the third subsystem 7.2.3, the controller variables, i.e., the longitudinal dynamic control error quantities s_err, v_err, a_err are determined for the feedback unit 7.1.2.

In a first step, in subsystem 7.2.3 the predicted actual/required deviations $s\_err\_P_j(t_{\_Pj})$, $v\_err\_P_j(t_{\_Pj})$, $a\_err\_P_j(t_{\_Pj})$ for all temporally forward control reference points $P_j$ are determined from the difference between the required values $s\_soll(t_{Pj})$, $v\_soll(t_{\_Pj})$, $a\_soll(t_{\_Pj})$ determined from the required longitudinal dynamic trajectories s_soll_trj, v_soll_trj, a_soll_trj for the respective control reference points $P_j$ and the predicted actual values $s\_pred(t_{\_Pj})$, $v\_pred(t_{\_Pj})$, $a\_pred(t_{\_Pj})$ of the longitudinal position s, of the driving speed v and of the acceleration a of the vehicle for the respective control reference point $P_j$, according to the relations:

$$s\_err\_P_j(t_{\_Pj})=s\_soll(t_{\_Pj})-s\_pred(t_{\_Pj}),$$

$$v\_err\_P_j(t_{\_Pj})=v\_soll(t_{\_Pj})-v\_pred(t_{\_Pj}),$$

$$a\_err\_P_j(t_{\_Pj})=a\_soll(t_{\_Pj})-a\_pred(t_{\_Pj}),$$

in each case with j=1, ..., R.

Moreover, in subsystem 7.2.3 the current actual/required deviation v_err_ist of the driving speed v and the current actual/required deviation a_err_ist of the acceleration a are determined according to the relations:

$$v\_err\_ist=v\_soll(t_k)-v\_ego \text{ and}$$

$$a\_err\_ist=a\_soll(t_k)-a\_ego$$

In a second step, using the current longitudinal position error s_err_ist determined in the actual position error determination unit 4, the resultant longitudinal dynamic control error quantities s_err, v_err, a_err are determined by weighted summations of the current and predicted actual/required deviations of the longitudinal position s, of the driving speed v and of the acceleration a according to the relations:

$$s\_err=(\{G_{s\_P0}*s\_err\_ist\}+\{\Sigma(G_{s\_Pj}*s\_err\_P_j(t_{\_Pj}))\})/ G_{s\_sum},$$

$$v\_err=(\{G_{v\_P0}*v\_err\_ist\}+\{\Sigma(G_{v\_Pj}*v\_err\_P_j(t_{\_Pj}))\})/ G_{v\_sum},$$

$$a\_err=(\{G_{a\_P0}*a\_err\_ist\}+\{\Sigma(G_{a\_Pj}*a\_err\_P_j(t_{\_Pj}))\})/G_{a\_sum},$$

in each case with j=1, ..., R, and supplied to the feedback unit 7.1.2.

In this case the quantities $G_{s\_sum}$, $G_{v\_sum}$ and $G_{a\_sum}$ represent the respective sums of the control error weights for the control reference points, wherein these sums are determined according to the relations:

$$G_{s\_sum}=G_{s\_P0}+\Sigma G_{s\_Pj},$$

$$G_{v\_sum}=G_{v\_P0}+\Sigma G_{v\_Pj} \text{ and}$$

$$G_{a\_sum}=G_{a\_P0}+\Sigma G_{a\_Pj},$$

in each case for j=1, ..., R.

In the first subsystem 7.2.1, using the required acceleration trajectory a_soll_trj determined in the required longitudinal dynamic trajectory determination unit 5, the longitudinal dynamic feedforward set point a_set for the controller feedforward unit 7.1.1 is determined by weighted summation of the current required longitudinal acceleration a_soll ($t_k$) and the required longitudinal accelerations a_soll ($t_{\_Pj}$) for the temporally forward control reference points $\{P_1, \ldots, P_j, \ldots, P_R\}$ according to the relation:

$$a\_set=(\{G_{ff\_P0}*a\_soll(t_k)\}+\{\Sigma(G_{ff\_Pj}*a\_soll(t_{\_Pj}))\})/ G_{ff\_sum},$$

with j=1, ..., R.

Moreover, $G_{ff\_sum}$ represents the sum of the feedforward weights and is determined according to the relation:

$$G_{ff\_sum}=\Sigma G_{ff\_Pj}$$

with j=1, ..., R.

A further exemplary embodiment envisages, in the EGO prediction, taking into account the position control behavior and the behavior of the controlled variable limiter. An exemplary embodiment with the position control behavior taken into account in the EGO prediction envisages a fourth-order longitudinal dynamic model, in which a second-order delay element with a damping constant D_sys and a system time constant T_sys is used for the response behavior between required and actual acceleration.

In this case x=[x1, x2, x3, x4] represents a state vector describing the longitudinal dynamic behavior with the four states:
stretch of road x1=s_pred,
driving speed x2=v_pred,
longitudinal acceleration x3=a_pred and
longitudinal acceleration jerk x4=r_pred.

The discrete system matrix $A_d$ represents a four by four matrix, the input vector $b_d$ represents a four by one vector, the respective elements of which are dependent on the prediction time increment dT, the damping constant D_sys and system time constant T_sys.

The initial state vector x_0 comprises, as a further element, the initial acceleration jerk, which is initialized to zero, i.e. x4_0=x4($t_i$=$t_k$)=r_pred (tau=0)=0.

The system input U is the longitudinal acceleration control value U_asoll, which is limited as a function of the driving speed. In each prediction step (i), the longitudinal dynamic control error quantities s_err, v_err, a_err as described above are determined once again, in each case by weighted summation of the current and predicted actual/required deviations of the longitudinal position s, of the driving speed v and of the acceleration a.

Determination of the feedforward set point a_set takes place as described above from a weighted sum for the current required value of the longitudinal acceleration a_soll ($t_k$) and the required values of the longitudinal acceleration determined for the temporally forward control reference points $\{P_1 \ldots P_j, \ldots, P_R\}$.

The system input U corresponding to the control law used of the limitation used is determined in each prediction step (i). As an example, a controller feedforward unit 7.1.1 determines, as output, the feedforward control actuating component U_asoll_ff according to the relation:

$$U\_asoll\_ff = K_{ff} * a\_set,$$

wherein $K_{ff}$ represents the aforementioned feedforward factor.

An advantageous embodiment of a feedback unit 7.1.2 uses a position state control system, which determines as output the feedback control actuating component U_asoll_fb according to the relation:

$$U\_asoll\_fb = K_s * s\_err + K_v * v\_err + K_a * a\_err$$

wherein $K_s$, $K_v$ and $K_a$ represent the aforementioned feedback factors.

The unlimited intermediate longitudinal acceleration control signal U_asoll_sum formed from the summation of the control actuating component is limited in each prediction step (i) according to driving speed-dependent limitation characteristics K9 and K10 stored in the limiting unit 7.3 for the actuating elements of the drive device 9 and the braking device 10 to a longitudinal acceleration control signal U_asoll predicted for this prediction step (i) and then fed back to the longitudinal dynamic model as system input.

An especially advantageous embodiment strategy envisages, in the control point and control error determination unit 7.2, an online-optimized control point selection from a preset limited number of W+1 possible control reference points $P_j$, previously defined manually via the control point look-ahead times $\{0, tau_{P1}, \ldots, tau_{Pj}, \ldots, tau_{PW}\}$.

In this case, at each current, real time point $t_k$, for selecting the optimum control reference point P from the W+1 possible control reference points $\{P_0, P_1, \ldots, P_j, \ldots, P_W\}$, the EGO prediction for each of the W+1 possible control points P, i.e., W+1 times, is performed with the prediction horizon T_pred, and at the end of the respective EGO prediction, a quality functional is determined by means of the longitudinal position control error s_err_$P_j$ (dT*i) predicted in each prediction step (i) and the predicted speed-dependent limited longitudinal acceleration control signals U_asoll_$P_j$ (dT*i).

A further embodiment strategy envisages, in the control point and control error determination unit 7.2, an online-optimized control reference point selection from a limited number of W possible control reference point pairs [$\{P_0, P_1\}, \ldots, \{P_0, P_j\}, \ldots, \{P_0, P_W\}$], previously predefined manually via the control reference point look-ahead times $\{0, tau_{P1}, \ldots, tau_{Pj}, \ldots, tau_{PW}\}$ and via the control reference point weights [$\{G_{ff\_P0}, G_{s\_P0}, G_{v\_P0}, G_{a\_P0}\}, \ldots, \{G_{ff\_Pj}, G_{s\_Pj}, G_{v\_Pj}, G_{a\_Pj}\}, \ldots, \{G_{ff\_PW}, G_{s\_PW}, G_{v\_PW}, G_{a\_PW}\}$].

The first control reference point of the respective pair is set by a control reference point P0 characterized by the current time point $t_k$, and the second control reference point is set by a control reference point $P_j$ characterized by the forward time point $t_{\_Pj}$ relative to the current time point $t_k$ with a look-ahead time $tau_{\_Pj}$. In this case, at each current time point $t_k$, for selecting the optimum control reference point pair from the W possible control reference point pairs, the EGO prediction for each of the W possible control reference point pairs, i.e., W times, is performed with the prediction horizon T_pred and at the end of the respective EGO prediction, a quality functional is determined by means of the longitudinal position control error s_err_$P_{0j}$ (dT*i) predicted in each prediction step (i) and the predicted longitudinal acceleration control values U_asoll_$P_{0j}$ (dT*i).

At each current time point $t_k$, for each predefined control reference point $P_j$ or for each predefined control reference point pair $\{P_0, P_j\}$, using the longitudinal position control error s_err predicted in each prediction step (i) and the longitudinal acceleration control signals U_asoll the course-optimum quality functionals [$J_{s\_err\_P0}, \ldots, J_{s\_err\_Pj}, \ldots, J_{s\_err\_PW}$] or [$J_{s\_err\_P0P1}, \ldots, J_{s\_err\_P0Pj}, \ldots, J_{s\_err\_P0PW}$] characterizing position accuracy, and the consumption-optimum quality functionals [$J_{asoll\_P0}, \ldots, J_{asoll\_Pj}, \ldots, J_{asoll\_PW}$] or [$J_{asoll\_P0P1}, \ldots J_{asoll\_P0Pj}, \ldots, J_{asoll\_P0PW}$] characterizing control energy are determined according to the relations:

$$J_{s\_err\_Pj} = \Sigma\{K_{s\_Pj}(dT*i)*[s\_err\_P_j(dT*i)*s\_err\_P_j(dT*i)]\},$$

$$J_{asoll\_Pj} = \Sigma\{K_{asoll\_Pj}(dT*i)*[U\_asoll\_P_j(dT*i)*U\_asoll\_P_j(dT*i)]\}, \text{ or}$$

$$J_{s\_err\_P0Pj} = \Sigma\{K_{s\_P0Pj}(dT*i)*[s\_err\_P_{0j}(dT*i)*s\_err\_P_{0j}(dT*i)]\},$$

$$J_{asoll\_P0Pj} = \Sigma\{K_{asoll\_P0Pj}(dT*i)*[U\_asoll\_P_{0j}(dT*i)*U\_asoll\_P_{0j}(dT*i)]\},$$

with i=1, ..., N_pred, wherein $K_{s\_Pj}$, $K_{asoll\_Pj}$ or $K_{s\_P0Pj\ Pj}$, $K_{asoll\_P0Pj}$ are corresponding quality functional weighting parameters in the respective prediction step (i).

For each predefined control reference points Pj or for each predefined control reference point pair $\{P_0, P_j\}$, the resultant quality functional is determined from the sum of the course-optimum quality functional and the consumption-optimum quality functional according to the relation $J_{\_Pj} = J_{s\_err\_Pj} + J_{asoll\_Pj}$ or $J_{\_P0Pj} = J_{s\_err\_P0Pj} + J_{asoll\_P0Pj}$.

At each current time point $t_k$, the predefined control reference point $P_j$ or the predefined control reference point pair $\{P_0, P_j\}$ is selected that gives the smallest value of the resultant quality functional.

By establishing the quality functional weighting parameters, it is possible to influence the target for an online-optimized control point selection or control reference point pair.

For a position control system that is as positionally accurate as possible and possibly less comfortable, the quality functional weighting parameters $K_{s\_Pj}$ or $K_{s\_P0Pj}$ for the predicted longitudinal position control error are selected as larger compared to the quality functional weighting parameters $K_{asoll\_Pj}$ or $K_{asoll\_P0Pj}$ for the predicted longitudinal acceleration control signals U_asoll, so that longitudinal position control errors s_err are penalized more strongly.

For a position control system that is as comfortable as possible and possibly less positionally accurate, the quality functional weighting parameters for the predicted longitudinal acceleration control signals U_asoll are selected to be correspondingly larger.

Figure 5:
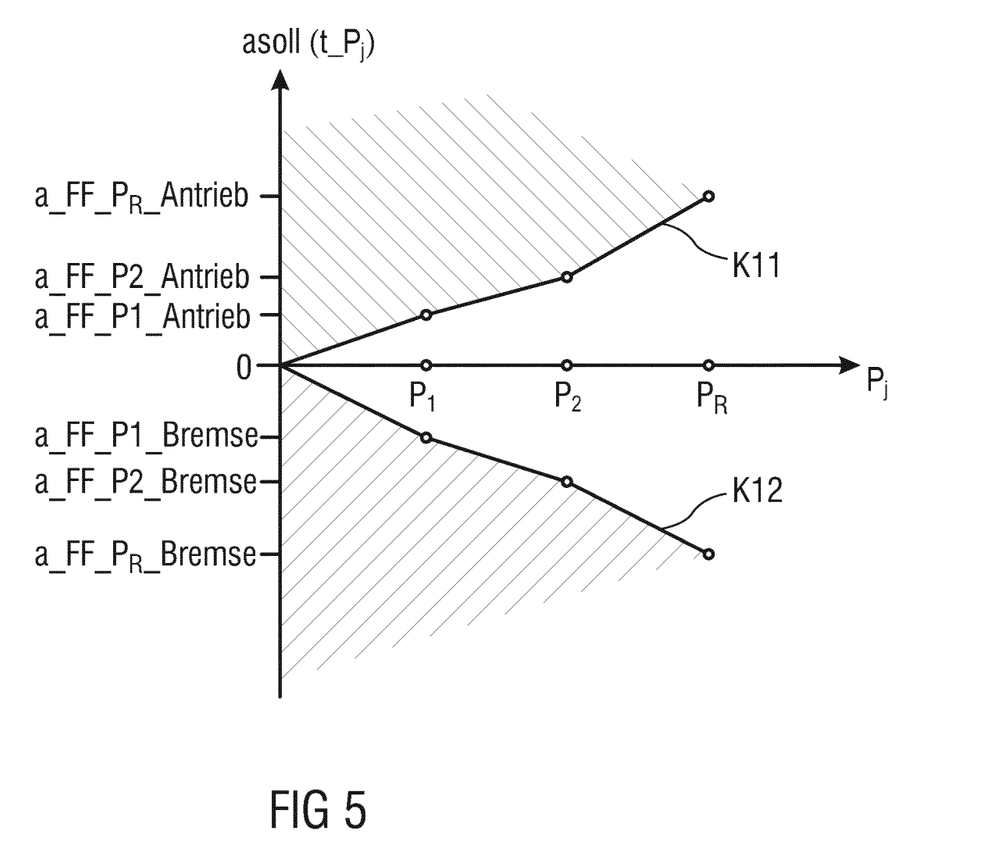

FIG. 5 shows, as an example, two limitation characteristics K11, K12 of the control point and control error determination unit 7.2 that are dependent on the control reference points $P_j$, which characterize the control region for the controller feedforward unit 7.1.1.

Another especially advantageous embodiment strategy envisages, in the control point and control error determination unit 7.2, an automatic control point sorting of individual available control reference points $P_j$, which is performed online. The control point sorting takes place at the current time point $t_K$, depending on whether the required values of the longitudinal position s, of the driving speed v or of the acceleration a, determined for the temporally forward control reference points $\{P_1, \ldots, P_j, \ldots, P_R\}$, lie within a predefined control region.

As an example, the control point sorting takes place for the controller feedforward unit 7.1.1, depending on whether the required values of the acceleration $\{a\_soll(t_{\_P1}), \ldots a\_soll(t_{\_Pj}), \ldots, a\_soll(t_{\_PR})\}$ determined for the forward control reference points $\{P_1, \ldots, P_j, \ldots, P_R\}$ lie within a control region predefined by the limitation characteristics K11 (for the drive device 9), K12 (for the braking device 10). The predefined control region is indicated graphically in FIG. 5 by the shaded region. When a required value of the acceleration lies outside of the predefined control region, the associated control reference point is discarded, i.e., the control reference point and the data assigned thereto are not taken into account during control.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in anyway. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for controlling a longitudinal position of a vehicle using a longitudinal positioning control system, the method comprising:
   determining a current control reference point corresponding to a current time point, and at least one forward control reference point, corresponding to a presettable look-ahead time point, as control-relevant time points;
   determining current or predicted deviations between an actual value and a required value of a longitudinal position, of a driving speed, and of an acceleration for each of the current control reference point and the at least one forward control reference point, wherein longitudinal dynamic control error quantities are formed based on the determined current or predicted deviations between the actual value and the required value of the longitudinal position, of the driving speed, and of the acceleration for each of the current control reference point and the at least one forward control reference point; and
   determining, for each of the current control reference point and the at least one forward control reference point, required values of accelerating the vehicle, wherein a longitudinal dynamic feedforward set point is determined based on the determined required values of accelerating the vehicle, and wherein the longitudinal dynamic feedforward set point is formed by weighting and summing together the required values of the acceleration determined for the current control reference point and the at least one forward control reference point; and
   generating, from the longitudinal dynamic feedforward set point and the longitudinal dynamic control error quantities, a longitudinal acceleration control signal for a subordinate acceleration control unit, wherein the subordinate acceleration control unit controls the acceleration of the vehicle based on the generated longitudinal acceleration control signal.

2. The method of claim 1, further comprising:
   forming the longitudinal dynamic control error quantities for the longitudinal position, the driving speed and the acceleration,
   wherein the longitudinal dynamic control error quantities are formed by weighting and summing together the current and predicted deviations between the actual value and the required value of the longitudinal position or of the driving speed or of the acceleration determined for the current control reference point and the at least one forward control reference point.

3. The method of claim 1, further comprising:
   determining the longitudinal dynamic feedforward set point and the longitudinal dynamic control error quantities based on a specified required value, wherein temporal required variations of the longitudinal position, of the driving speed, and of the acceleration of the vehicle are preset by specifying the required value.

4. The method of claim 3, wherein the temporal required variation of the longitudinal position presets a length of a stretch of road, which the vehicle should cover over time starting from the current control reference point.

5. The method of claim 3, wherein the determination of the predicted deviation between the actual value and the required value of the longitudinal position, of the driving speed and of the acceleration comprises:

determining, for the at least one forward control reference point and based on the specified required value, future required values of the longitudinal position, of the driving speed, and of the acceleration;

determining, for the at least one forward control reference point and based on a prediction of motion of the vehicle, predicted actual values of the longitudinal position, of the driving speed and of the acceleration; and determining, for the at least one forward control reference point and based on the future required values and predicted actual values, predicted deviations between the actual value and the required value of the longitudinal position, of the driving speed and of the acceleration.

6. The method of claim 1, further comprising:

determining the current deviations between the actual value and the required value of the longitudinal position, of the driving speed, and of the acceleration are by determining current required values of the longitudinal position, of the driving speed, and of the acceleration for the current control reference point, based on the specified required value; and comparing the determined current deviations between the actual value and the required value of the longitudinal position, of the driving speed, and of the acceleration, to a respective determined current actual value of the position, of the driving speed or of the acceleration of the vehicle.

7. The method of claim 1, further comprising:

generating, in the longitudinal positioning control system, a feedforward controller actuating component from the longitudinal dynamic feedforward set point;

generating, in the longitudinal positioning control system, a feedback controller actuating component from longitudinal dynamic control error quantities; and forming the longitudinal acceleration control signal by summing the feedforward control actuating component and the feedback controller actuating component.

8. The method of claim 1, further comprising:

testing, for the at least one forward control reference point, whether a required value of the longitudinal position, driving speed, or acceleration determined for a respective control reference point, lies within a specified control region, wherein the at least one forward control reference point is not accounted for during control of the longitudinal position of the vehicle when the testing shows that the determined required value is not within the specified control region.

9. A device for controlling a longitudinal position of a vehicle, the device comprising:

a longitudinal positioning control system configured to generate
   a feedforward controller actuating component from a longitudinal dynamic feedforward set point and a feedback controller actuating component from longitudinal dynamic control error quantities, and
   a longitudinal acceleration control signal for an acceleration control unit acting on a drive device and braking device of the vehicle based on a summation of the feedforward controller actuating component with the feedback controller actuating component; and a control point and control error determination unit configured to determine
   the longitudinal dynamic control error quantities based on a weighted summation of determined current deviations between an actual value and a required value and predicted deviations between an actual value and a required value of a longitudinal position, of a driving speed and of an acceleration, and
   the longitudinal dynamic feedforward set point based on a weighted summation of current and future required values of the acceleration.

* * * * *